UNITED STATES PATENT OFFICE.

ROBERT T. HOGG, OF OXFORD, PENNSYLVANIA.

FOOD PRODUCT.

1,278,468.     Specification of Letters Patent.    Patented Sept. 10, 1918.

No Drawing.     Application filed February 23, 1918.    Serial No. 218,709.

*To all whom it may concern:*

Be it known that I, ROBERT T. HOGG, a citizen of the United States, residing at Oxford, in the county of Chester and State of Pennsylvania, have invented certain new and useful Improvements in Food Products; and I do hereby declare the following to be a full, clear, and exact description of the invention, such as will enable others skilled in the art to which it appertains to make and use the same.

The invention is a mixed food product which is intended as a substitute for, and to simulate what is known as "scrapple," a food product containing scrapped pieces of pig meat and of the hide and skin of the pig, or the finely-chopped boiled meat of a beef; the essence or the liquor in which the meat was cooked; water; cereal which will thicken the product, and such seasoning as may be desired. This product is usually cut into slices and fried.

In producing my improved product, I substitute for the pork or beef, milk or a milk product, thereby obtaining an article of food which very closely resembles "scrapple" in appearance, but is less greasy and more palatable and nourishing.

My product may be made according to the following process, although there are other specific ways of making it:

Equal parts of corn meal, whole-rye flour, and oat meal, are mixed to a batter with condensed milk to which has been added about a pint of luke-warm (not hot) water. This batter is then poured into three pints of boiling water and thoroughly stirred until it is cooked. The mush-like product is poured in a mold and allowed to cool until it solidifies, when it is ready to be eaten, although it is preferable to fry it in slices like "scrapple."

Fresh milk may be substituted for the diluted condensed milk, or any wet or dried milk product, or various cheeses, casein, butter, or powdered milk, may be used.

Any cereal ground to the fineness of rolled oats, to give the final product the texture of meat "scrapple," as wheat grits, fine corn meal (bur ground), ordinary oat meal, barley flour, or buckwheat, or mixtures thereof, may be used as a thickening material. A condiment, such as pepper, or sugar is sometimes added, or an onion or other flavoring may be given to the product.

What I claim, is:

1. A food product intended as a substitute for scrapple, comprising cereals and milk products, the whole being cooked and having the appearance of scrapple.

2. A food product of corn meal, rye flour and oat meal with a milk product, the whole being cooked and forming a substitute for scrapple.

3. A food product comprising cereal products and a milk product, the whole when cooked having the appearance of, and forming a substitute for scrapple.

In testimony whereof, I affix my signature.

ROBERT T. HOGG.

Copies of this patent may be obtained for five cents each, by addressing the "Commissioner of Patents, Washington, D. C."